2 Sheets—Sheet 1.

W. A. AMBERG.

Temporary Binder.

No. 8,980. Reissued Nov. 25, 1879.

*Witnesses*

Jno H Amberg

L L Bond

*Inventor.*

William A. Amberg

THE NORRIS PETERS CO., WASHINGTON, D. C.

2 Sheets—Sheet 2.

W. A. AMBERG.

Temporary Binder.

No. 8,980. Reissued Nov. 25, 1879.

*Witnesses.*

Jno H Amberg

L L Bond

*Inventor.*

William A. Amberg

THE NORRIS PETERS CO., WASHINGTON, D. C.

UNITED STATES PATENT OFFICE.

WILLIAM A. AMBERG, OF CHICAGO, ILLINOIS.

IMPROVEMENT IN TEMPORARY BINDERS.

Specification forming part of Letters Patent No. 92,141, dated July 6, 1869; Reissue No. 4,989, dated July 16, 1872; Reissue No. 8,209, dated May 7, 1878; Reissue No. 8,980, dated November 25, 1879; application filed August 18, 1879.

*To all whom it may concern:*

Be it known that I, WILLIAM A. AMBERG, of Chicago, in the county of Cook and State of Illinois, have invented a new and useful Improved Paper-Holder, File, and Binder; and I do hereby declare and make known that the following is a full, clear, and exact description of the same, reference being had to the accompanying drawings, and the letters and figures marked thereon, which form part of this specification.

My invention consists of various combinations constituting a novel device, in which letters or bills or other papers may be filed and indexed, and in which they are firmly held in place, and in which, when the device is filled, or when enough papers, bills, or letters are filed to form a volume, the letters, bills, or other papers may be securely bound together, either with or without the index, as hereinafter fully set forth.

To enable those skilled in the art to understand how to construct and use my said invention, which I have represented in the accompanying drawings, I will proceed to describe the form of device in which I embodied the said invention in the application for my original patent.

Figure 1:
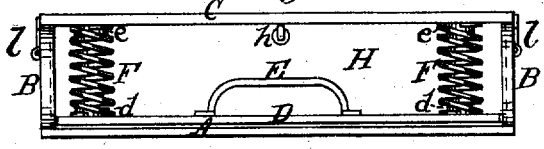
Figure 2:
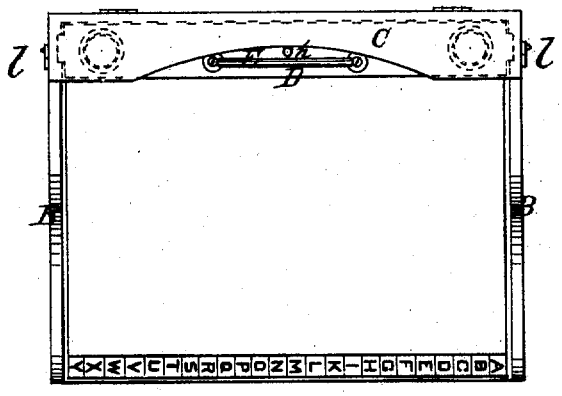
Figure 3:
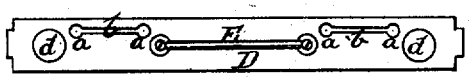
Figure 4:
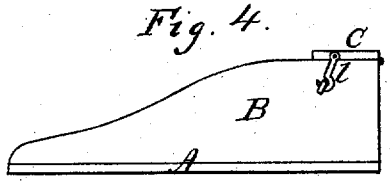
Figure 5:
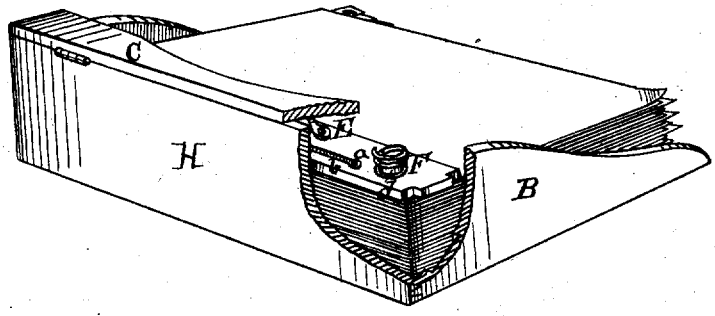
Figure 6:
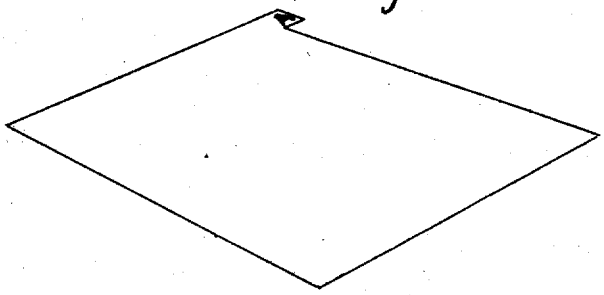
Figure 7:
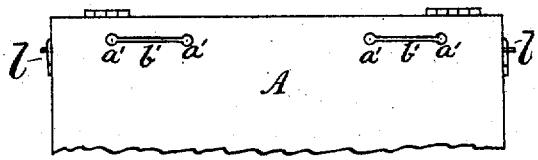

Figure 1 represents a front view or elevation of my said device. Fig. 2 is a plan or top view of the same. Fig. 3 is a top view of the pressing-bar which holds the papers in place. Fig. 4 is a side view of said device. Fig. 5 is a view in perspective, with parts broken away, showing the device when nearly filled with papers. Fig. 6 is a view of an index-sheet; and Fig. 7 is a view of the under side of the bottom of the device.

The same letters of reference in the several figures denote the same parts.

A represents the bottom of the device, which is provided with side pieces, B B, and back H, as shown, the said back being rigid, and being rigidly secured to the bottom, and the height of the back and that part of the sides adjacent being sufficient to allow the desired number of letters, bills, or other papers to be laid in the box and below the top C of the device, which is connected to the back H by hinges, and is secured in place by means of hasps or hooks *l*, as shown in the drawings.

The width of the box from back to edge is designed to be sufficient to permit ordinary letter and legal or foolscap paper to be laid or filed crosswise of the sides or lengthwise of the back, without covering the projections of the index-sheets, hereinafter described; but the dimensions of the box are immaterial, and it may be made of any desired size.

Beneath the cover or top C is arranged a strip of wood or other material, (marked D,) upon the top of which, near each end, is a block, *d*, over which a spiral coil-spring is arranged, said blocks *d* serving to keep the springs in place, while the upper ends of said springs are retained in place by means of similar blocks *e* upon the under side of the top piece, C, as shown, the said top piece or cover, when secured, forming a bearing for the springs. Instead of said springs, springs of rubber or conical coil-springs may be used, secured in position in any desired manner. The said springs tend to press the bar D down upon whatever is placed beneath it, so that it constitutes a pressing-bar; and it is provided with a handle whereby it may be raised up, which handle may be passed over a hook, *h*, and held up, when desired. The matter beneath the pressing-bar may be released from the pressure of the springs by unhooking the fastenings *l*, which allows the cover or top C to be swung upon its hinges. In said pressing-bar, and also in the bottom directly beneath, are slots *b b'*, whose ends are formed with enlargements *a a'* for the purpose of facilitating the binding of the filed matter contained in the holder, when desired, as hereinafter described. In the said box or case is a series of flexible card-board sheets, indexed, as shown—that is to say, the said sheets are formed with projections at their outer edges, which are arranged stepwise, so that the index-characters applied to the several projections of the index-sheets are in successive order and are presented to view simultaneously. Between these index-sheets, under appropriate letters, the letters, bills, or other papers may be placed without folding, to facilitate reference thereto, when desired.

The papers are placed in the holder between the appropriate index-sheets, one edge of each paper being placed against the back piece H, and the paper being otherwise adjusted so that one end is in contact with a side piece, B. As the series of index-leaves are not so connected that their inner edges are held in juxtaposition, the series of index-sheets is expansible and the quantities of papers introduced between the successive index-sheets may be varied as required. Thus the papers may be filed and be held in place by means of the pressing-bar D until the holder is full, when the index-sheets may, if desired, be withdrawn, and the entire contents of the file be bound together and removed, ready for another set or series.

To bind the files, the hooks *l* are detached, and the cover C thrown back upon its hinges, when perforations are made by passing an awl through the holes *a*, through which tapes are passed and drawn down through the bottom and tied, the tapes passing through the slots *b b'*, whereupon the bar D is removed, and the file, properly and securely bound, is taken out, as aforesaid.

Instead of the arrangement herein shown, the springs may be so arranged as to operate in connection with the side pieces, B, in which case, if my entire invention is not to be used, the cover or top C may be dispensed with; or said springs may operate against lugs formed upon the top of the back H or sides B.

The only service which the side pieces B B perform, as respects filing, is to keep the ends of the papers filed even and straight.

Having described the construction and operation of the device containing my invention, I will specify what I claim, and desire to secure by Letters Patent, as follows:

1. The combination, substantially as before set forth, of the bottom, back, and sides, the pressing-bar, the springs thereof, and a cover or top extending across and forming a bearing for the springs, substantially as described.

2. The combination of the bottom, the rigid back rigidly secured thereto, the side pieces, and the series of expansible stepped index-sheets adapted to receive variable quantities of filed matter between them, and to present the characters of the successive index-sheets simultaneously to view, substantially as hereinbefore set forth.

3. The expansible stepped index, composed, substantially as hereinbefore set forth, of flexible sheets, which are unattached at their inner edges, and are provided at their outer edges with stepped projections to present successive indicating-letters to view simultaneously.

4. The paper-holder having a fixed bottom, sides, and back secured rigidly to each other, a pressing-bar, and an expansible index whose sheets are adjustable at their inner edges, to admit a variable quantity of filed matter between them, all substantially as set forth.

5. The combination, substantially as before set forth, of the springs and hinged top for releasing them, with the bottom, the rigid back, and sides secured thereto, and the expansible stepped index adapted to receive variable quantities of filed matter between the sheets, substantially as specified.

6. The combination of the bottom provided with binding-openings, the rigid back fixed to said bottom, and the movable pressing-bar provided with binding-openings, substantially as and for the purpose hereinbefore set forth.

WILLIAM A. AMBERG.

Witnesses:
W. L. BENNEM,
H. H. ISAACS.